Patented Dec. 2, 1947

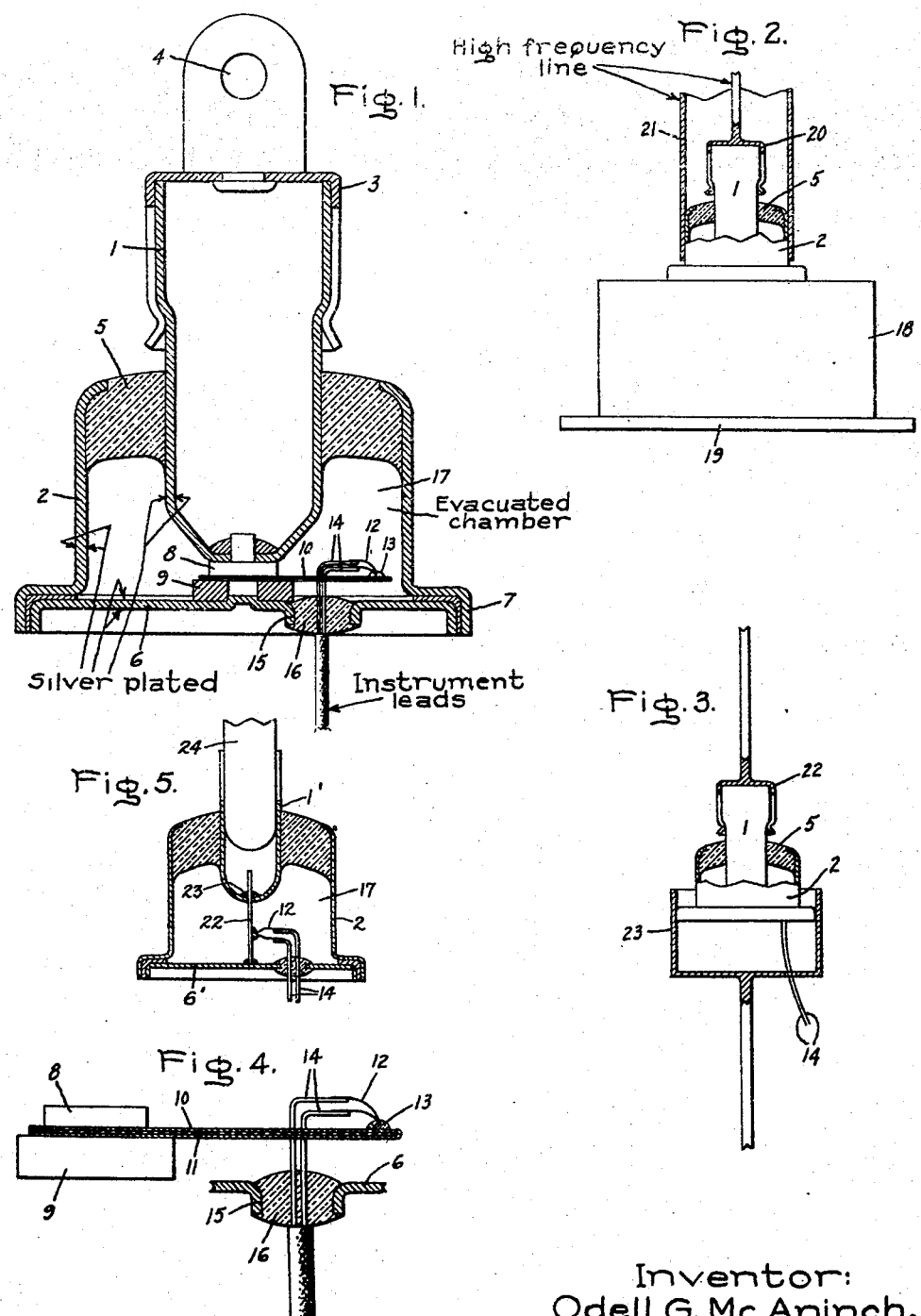

2,431,953

UNITED STATES PATENT OFFICE 2,431,953

HIGH-FREQUENCY THERMOCOUPLE

Odell G. McAninch, Lynn, Mass., assignor to General Electric Company, a corporation of New York Application November 15, 1945, Serial No. 628,846

4 Claims. (Cl. 136—4)

My invention relates to high-frequency thermocouples, and its object is to provide a reliable, low-cost device of this character which has good accuracy over a considerable range of frequency and is characterized by low impedance. The thermocouple of my invention may be considered to be an improvement over the high-frequency thermocouple ammeter of United States Patent No. 2,199,247, April 30, 1940.

The features of my invention which are believed to be novel and patentable will be pointed out in the claims appended hereto. For a better understanding of my invention, reference is made in the following description to the accompanying drawing in which Fig. 1 represents a cross-sectional view through a concentric terminal thermocouple embodying my invention, Fig. 2 shows its combination with a measuring instrument for measuring the voltage across the thermocouple and a concentric line plug-in arrangement for connecting the thermocouple instrument in a high-frequency line, Fig. 3 represents a portion of a high-frequency line with my high frequency thermocouple inserted therein by concentric plug connections, Fig. 4 is an enlarged view of the heater element of the thermocouple, and Fig. 5 is a modified high-frequency thermocouple unit having an axial heater element.

Referring now to Fig. 1, 1 and 2 represent concentric, cylindrical metallic line terminals of the thermocouple unit which serve also as supporting structure for the unit. A terminal adapter 3 having a split resilient cylindrical plug socket fitting over terminal 1 and a conductor connecting hole 4 is included in Fig. 1. The terminals 1 and 2 are insulated from each other as well as held in concentric supporting relation by a glass or other insulator 5 molded in place and providing a hermetic seal between the insulation 5 and terminal parts 1 and 2. A circular metallic base part 6 fits within the enlarged rim 7 of terminal part 2 and is soldered or brazed in place to part 2 and closes the other end of the unit. Metallic buttons 8 and 9 on the inner end of terminal 1 and on the inner side of closure 6 are closely spaced from each other on the center axis of the unit and form the terminals to the thermocouple heater element 10. Heater element 10 is a thin flat strip of resistance conductor material such as platinum, iridium alloy adapted to be heated by the current passing therethrough. The heater strip extends radially from one button 8 and is then doubled back on itself and returns to button 9. Between the two parallel sections of the strip there is provided a thin strip of mica insulation 11 as generally represented in Fig. 4. The heater strip for a 5-ampere heater circuit may be .085 inch wide, .002 inch thick, and $\tfrac{7}{8}$-inch long, total length, with its two parts separated by .001 inch of mica insulation. The hot junction of the thermocouple 12 is insulated from but in good thermal relation with heater strip 10 by being secured thereto by a glass bead 13. The two wires of the thermocouple may be made of platinum, iridium alloy and gold, palladium alloy. A pair of wires 14 connect to the thermocouple and pass out of the unit for connection to a suitable, sensitive direct current measuring instrument calibrated in terms of the alternating current which energizes and passes through the heater 10.

An opening 15 is provided in the closure wall 6 through which the leads 14 pass and this opening is then hermetically sealed by fused glass 16 which electrically insulates the leads 14 from each other and from the alternating current circuit, securely holds them in place, and produces intimate thermal relation between the terminals of the thermocouple 12 and supporting base 6. The outgoing leads are kept close together to avoid alternating current pickup. The inner end of tubular terminal 1 is hermetically sealed by the metallic button 8 which is soldered in place to terminal 1. Hence, the thermocouple 12 is contained within a hermetically sealed chamber 17 which is evacuated. The hottest portion of the heater 10 and the thermocouple hot junction thereon is therefore largely heat insulated from the walls of the cup members by being spaced therefrom in an evacuated chamber and hence, the unit can operate at highest efficiency and responds quickly to changes in heater current.

The alternating current circuit is from terminal 1, through button 8, heater 10, button 9, closure wall 6 to outer concentric terminal 2. The parts 1, 8, 9, 6, and 2 are preferably made of iron but are coated inside and out by a thin layer of silver as by plating with a .0015 inch coating of silver thereon. Hence, the high-frequency current flows in the low resistance silver coating, keeping skin effect and variation of A.-C. impedance with frequency at a minimum.

The concentric terminals, the practical elimination of skin effect in the terminals by reason of the silver coating, and the parallel, closely spaced arrangement of the circuit of heater strip 10 all help to eliminate A.-C. impedance changes with frequency so that the device operates without serious frequency error over a wide range of frequency. Due to the high heat insulation of the thermocouple hot junction in a vacuum, a fairly low resistance strip 10 for a given heater current rating may be used and this, together with the high conductivity of the silver alternating current circuit, makes the initial A.-C. impedance of the device exceptionally low. Thus I have provided a high-sensitivity, high-frequency current measuring device with minimum frequency error.

The direct current instrument circuit is electrically and inductively insulated from the A.-C. circuit by the glass beads at 13 and 16 and by the close spacing of the instrument leads 14 in the vicinity of the A.-C. circuit. High frequency currents which might otherwise be picked up or allowed to circulate through the instrument leads in parallel and back through the heater by various high capacity paths are suppressed and hence do not produce extraneous heating errors.

Test results show that in a 5-ampere full scale instrument calibrated at low frequency, the true current at high frequencies can be obtained by multiplying the instrument reading on high frequency current by a scale multiplying factor, and that these factors are approximately 0.90 at 50 megacycles.
0.84 at 100 megacycles.
0.77 at 150 megacycles.
0.72 at 200 megacycles.

In Fig. 2 a direct current electrical measuring instrument case 18 is supported on the outer concentric terminal 2, and contains a suitable measuring instrument below the thermocouple unit as here represented with its pointer and scale exposed to view through a window in the bottom end thereof. The casing may have a flange 19 for mounting on a panel. Concentric plug socket type terminals 20 and 21 are provided at the end of the incoming concentric cable high frequency circuit and make a sliding fit over the inner and outer concentric terminals 1 and 2 of the thermocouple unit.

In Fig. 3 the thermocouple unit is connected colinearly in a high frequency line having plug socket type terminals 22 and 23 which make a sliding fit over the outer and inner concentric terminals 1 and 2 of the thermocouple unit. The line terminals in Figs. 2 and 3 may be split so as to spring apart slightly when the connections are made, and where the connection is to be permanent they may be soldered in place. Line terminal 1 may be either the male or female member of the plug socket. The D.-C. instrument leads 14 are brought out through an opening or one of the slits in the line terminal 23.

It is to be noted that the outer terminal 2 with its bottom closure 6 forms a metallic cup and that the inner terminal 1 with its end closure 8 forms a smaller metallic cup. The two cups are disposed or nested together concentrically one within the other, with their bottoms and side walls spaced apart by the insulation medium 5 which with terminal 1 forms the hermetically sealed closure at the mouth of the larger cup. Reduced size central bottom end cup portions approach adjacent each other, and the thermocouple heater is connected between these closely spaced end parts and extends radially in a flat loop clear of the cup walls in the ample remaining available cup shaped space which is evacuated.

In Fig. 5, I have shown a modified form of high frequency thermocouple unit where the heater designated by 22 is connected axially between the central bottom ends of the two cups. In assembling this form of the device, the heater wire 22 is assembled to the inner side of the end plate 6' with the thermocouple 12 and lead wires 14 prior to the soldering of end plate 6' to the part 2. A small opening is left in the tip of the cup 1' through which the heater wire 22 is threaded and after the plate 6' is soldered in place, the heater wire 22 is drawn taut, and the opening in the tip of cup 1' with the heater wire extending therethrough is closed by solder as indicated at 23. The extra length of the heater wire which extends into cup 1' may then be clipped off. As shown in Fig. 5, the smaller, inner cup 1' is used as the female member of a plug socket coupling with the line represented by 24.

What I claim as new and desire to secure by Letters Patent of the United States is:

1. High-frequency current measuring apparatus comprising a pair of different sized metal cups forming the high frequency line terminals to said apparatus, the smaller cup being concentrically nested within the larger cup with the bottoms of the cups spaced apart, the concentric side walls of said cups being spaced apart by insulation at the open end of the larger cup which insulation hermetically seals the remaining intervening space between the two cups, said space being evacuated, a thermocouple heater connected between the centers of the bottom end portions of said cups in said evacuated space, a thermocouple with its hot junction in thermal relation but electrically insulated from said heater and instrument lead wires from said thermocouple sealed through a wall of one of said cups, said seal insulating said lead wires from each other and from the cup but providing a path of good thermal conductivity between the lead wires and the cup.

2. High-frequency current measuring apparatus comprising a pair of different sized metallic cups the inner diameter of the larger cup being appreciably greater than the outer diameter of the smaller cup, said cups being concentrically nested together one inside the other with their bottom walls spaced apart, insulation extending between the side walls of said cups maintaining said cups in said concentric spaced relation, a heater element connected between the adjacent bottom end walls of said cups, a thermocouple element with its hot junction in thermal relation but electrically insulated from said heater element, and closely spaced instrument lead wires extending from said thermocouple through an opening in the wall of one of said cups to the exterior thereof said lead wires being insulated from but in good thermal relation with said cup wall at such opening, said cups having silver-plated surfaces and comprising the high frequency line terminals of said apparatus.

3. High-frequency current measuring apparatus comprising a pair of different sized metallic cups the smaller cup being inserted in the larger cup with their bottom walls spaced apart and with their side walls concentrically spaced apart, insulation closing the opening between the mouth of the larger cup and the adjacent outer wall of the inner cup and hermetically sealing off the intervening space between said cups around the bottom end of the smaller cup, said space being evacuated, a ribbonlike heater element connected between the adjacent center faces of the two cups and extending radially in a flat loop from said points of connection clear of the cup walls within the evacuated space with insulation between the parallel heater sections of the loop, a thermocouple with its hot junction electrically insulated from but in good thermal contact with the heater element near the looped portion thereof, closely spaced instrument lead wires from said thermocouple sealed through the bottom wall of said larger cup said seal being airtight, electrically insulating the lead wires from each other and from the cup and providing intimate thermal relation between the lead wires and the cup, said cups being made of silver-plated iron and forming the high frequency line terminals of said apparatus.

4. High-frequency current measuring apparatus comprising a pair of different sized metallic cup members nested together concentrically, insulation holding said cups in such relation and hermetically sealing off a cup-shaped space between said cup members, said space being evacuated, said cup members being silver-plated and comprising plug socket type high frequency line terminals of such apparatus, a heater element connected between said cup members within the evacuated space, a thermocouple with its hot junction electrically insulated from but in good thermal contact with said heater element within said evacuated space, said hot junction being spaced away from the walls of the cup members, and closely spaced instrument lead wires extending from said thermocouple to the exterior of said evacuated space through a glass seal in the wall of one of the cup members.

ODELL G. McANINCH.

REFERENCES CITED

The following references are of record in the file of this patent:

UNITED STATES PATENTS

| Number | Name | Date |
|---|---|---|
| 2,199,247 | Rich et al. | Apr. 30, 1940 |
| 2,284,379 | Dow | May 26, 1942 |
| 2,352,056 | Wilson | June 20, 1944 |
| 2,365,207 | Moles | Dec. 19, 1944 |